(12) United States Patent
Houston (10) Patent No.: US 6,880,959 B2
(45) Date of Patent: Apr. 19, 2005

(54) VEHICLE ILLUMINATION GUIDE

(76) Inventor: Timothy K. Houston, 11210 Travis Gulch Dr., Charlotte, NC (US) 28277

( * ) Notice: Subject to any disclaimer, the term of this patent is extended or adjusted under 35 U.S.C. 154(b) by 10 days.

(21) Appl. No.: 10/604,886

(22) Filed: Aug. 25, 2003

(65) Prior Publication Data

US 2005/0047164 A1 Mar. 3, 2005

(51) Int. Cl.$^7$ .................................................. F21V 9/00

(52) U.S. Cl. ...................... 362/511; 362/505; 362/559; 362/581; 362/485; 362/506; 362/223; 362/244; 362/251; 362/249; 362/295; 362/311; 362/326; 362/370

(58) Field of Search ........................ 362/511, 551, 559, 362/581, 485, 506, 544, 223, 225, 244, 251, 362/249, 295, 311, 326, 370, 505; 293/117; 359/515

(56) References Cited

U.S. PATENT DOCUMENTS

| | | |
|---|---|---|
| 1,760,327 A | 5/1930 | Thomas |
| 1,965,801 A | 7/1934 | Gandillon |
| 2,686,253 A | 8/1954 | Denard |
| 2,975,401 A | 3/1961 | Shupe |
| 3,858,924 A | 1/1975 | Bores |
| 3,998,285 A | 12/1976 | Cooper |
| 4,313,104 A | 1/1982 | Phillips |
| 4,755,791 A | 7/1988 | Kuroda |
| 4,955,577 A | 9/1990 | Ching |

(Continued)

FOREIGN PATENT DOCUMENTS

WO WO 03/049971 A1 6/2003

OTHER PUBLICATIONS web address—>www.atwchrome.com/bumperguidesacc. html, Jun. 24, 2003.
web address—>www.atwchrome.com/images/4579904160. gif, Jun. 24, 2003.
web address—>www.atwchrome.com/images/4579994594. gif, Jun. 24, 2003.
web address—>www.atwchrome.com/images/4579994685. gif, Jun. 24, 2003.
web address—>www.atwchrome.com/images/4579994681. gif, Jun. 24, 2003.

(Continued)

*Primary Examiner*—Stephen Husar
*Assistant Examiner*—Sharon Payne
(74) *Attorney, Agent, or Firm*—Summa & Allan, P.A.

(57) ABSTRACT

The invention is a vehicle illumination assembly that provides a vertically extending guide member connected to the bumper of a vehicle. The guide member includes a longitudinal opening and a top opening that each provide entry into the hollow interior of the guide member. The longitudinal opening encompasses a first light source that is bright enough to shine light from one end of the vehicle all the way past a second end of a vehicle. The top opening encompasses a marker light that visibly alerts a driver to the width of the vehicle. The vehicle illumination assembly of this invention may include a guide member that connects to a base member attached to a vehicle bumper. The separate guide member rotates around its longitudinal axis to direct light into a variety of directions, selectable by the driver from within the vehicle.

37 Claims, 5 Drawing Sheets

U.S. PATENT DOCUMENTS

| | | |
|---|---|---|
| 5,268,796 A | 12/1993 | Tomerlin et al. |
| 5,769,526 A | 6/1998 | Shaffer |
| 5,826,966 A | 10/1998 | Schwing |
| 6,328,462 B1 * | 12/2001 | De La Rosa ............... 362/485 |
| 6,409,367 B1 | 6/2002 | Pratt |

OTHER PUBLICATIONS web address—>www.truckpartsproshop.com/illuminated_bumper_guides.html, Jul. 25, 2003.

web address—>www.jcwhitney.com/product, Jun. 24, 2003.

* cited by examiner

VEHICLE ILLUMINATION GUIDE

BACKGROUND OF INVENTION

The invention relates to a vehicle illumination assembly that may be attached to the bumper of a vehicle to illuminate the area around the vehicle and to visibly mark the width of the vehicle. The vehicle illumination assembly described herein provides a marker light on the top tip of a vertically extending guide member attached to a vehicle bumper. The top marker light allows the driver to visibly determine the width of the vehicle. The vehicle illumination assembly also provides a light source of sufficient power to illuminate the body of the vehicle and the regions to the side and rear of the vehicle. This light source is strong enough to provide a beam of light from the front of the vehicle to the region around the rear of the vehicle, or vice versa, depending upon the bumper to which the guide connects. The invention includes the option of connecting the invented vehicle illumination assembly to each side of a bumper to provide even more light at the option of the user.

Providing light for a vehicle has been a common practice since the early days of automobile manufacture. Head-lights, fog lights, search lights, and other sources of illumination are common equipment on many different types of vehicles. For purposes of this disclosure, however, the field of vehicle illumination devices encompasses three broad groups: individual lamps added to various regions of a vehicle, light sources specifically added to the bumper of a vehicle, and bumper guides that provide only enough light to visibly mark the width of the vehicle.

As a preliminary matter, a search of the art shows that various types of lamps are available to attach to almost any region of a vehicle. Some of these lamps provide a lighting function, and some of the lamps are considered aesthetically pleasing additions to the vehicle. Vehicles are commonly equipped with auxiliary back-up lights, fog lights, or search lights attached to the vehicle and powered by the vehicle's own electrical system. U.S. Pat. No. 2,686,253, issued to Denard on Aug. 10, 1954, for example, shows a spotlight that may be conveniently carried in a rack on a vehicle, connected to the electrical power of a vehicle, and optionally turned on to illuminate a work area or other region around the vehicle. Denard of course has the drawback of not being permanently located in a region of the vehicle that is convenient for use if the vehicle is moving. Denard '253 allows the user to unclip the spotlight and aim the light in a number of directions, but the light must be returned to its holder before moving the vehicle. Denard '253 is a work light for use when the vehicle is not in motion.

U.S. Pat. No. 5,769,526, issued to Shaffer on Jun. 23, 1998, continues in the tradition of clipping a work light to a vehicle to illuminate an area around the vehicle. Shaffer provides a flood lamp with a power cord terminating in a plug that may be connected to the electrical system of a vehicle. Shaffer also uses a pair of pliar-like gripping jaws for the user to clamp the floodlight into a position on the vehicle. Shaffer does not show any type of light source that is remotely operable and continuously located in a convenient position on the vehicle. Shaffer '526 shows a light that will only be in use while the vehicle is stopped, and the light of the Shaffer invention must be manually clipped to a suitable position.

PCT Application by Brian N. Tuft, International Publication No. WO 03/049971 with a priority date of Nov. 16, 2001, shows tubular, or at least elongated, light assemblies added along the side of various moving vehicles. The elongated lights may be added in rows along the side of a boat, a car, or even a long distance hauling truck. Tuft '971 is concerned mainly with illuminating the actual body of the vehicle, making the body more visible. The Tuft light source does not provide extra illumination of the region around the vehicle, as the drawings indicate that the Tuft '971 light source radiates upwardly and downwardly with just enough luminescence to increase vehicle visibility.

Another collection of previously issued patents show light attachments specifically to the bumper of vehicles. An early version of a bumper light attachment actually served as a headlight for a vehicle. U.S. Pat. No. 1,760,327, issued to J. A. Thomas on May 27, 1930, shows a pilot headlight that shines outwardly from the front of the vehicle and is attached to the bumper of the car. This lighting system is basically an old fashioned headlight.

U.S. Pat. No. 1,965,801, issued to P. A. Gandillon on Jul. 10, 1934, shows various floodlights attached to bumpers of a vehicle to illuminate the vehicle for easier visibility by others. The Gandillon invention uses various screens on the light fixture to ensure that only the vehicle body is illuminated. The lights of the Gandillon invention provide almost no illumination to the areas around the perimeter of the car. In particular, the Gandillon '801 patent is silent as to the illumination of the area behind a vehicle for better visibility when operating the car in dark areas in the reverse direction.

U.S. Pat. No. 2,975,401, issued to W. F. Shupe on Mar. 14, 1961, provides a light attachment that may be added temporarily to a towed car hauled by a towing car. The Shupe '401 patent adds safety lights to the bumper of the towed vehicle. The towed vehicle covers the lights on the rear of the towing vehicle, so the addition of lights as shown in Shupe '401 is useful to provide indications of breaking, turning, or hazards. The Shupe '401 patent provides no disclosure related to illuminating regions to the sides or rear of a vehicle with a brighter light with strong luminescent power.

U.S. Pat. No. 6,409,367, issued to Richard Pratt on Jun. 25, 2002, shows a system for coupling a warning light to a rear of a vehicle. The system includes a coupling bar for connecting the unit to a conventional tow bar deployed on the rear of a vehicle. The coupling bar allows for temporary installation of a warning light that may be removed as necessary.

The patents showing lights attached to the bumper of a vehicle lack any disclosure of a permanently situated, optionally activated lighting system that can illuminate the region along and around the side of a vehicle. None of the patents cited to this point include light sources of sufficient luminescence to illuminate a region from one end of a vehicle to another. The patents are designed to illuminate the vehicle only for visibility by other drivers. The patents also fail to provide any insight into lighting systems that are remotely operable from within the vehicle while having sufficient luminescence to shed light beyond the length of the vehicle.

The last group of known lighting systems that are relevant here include specialized "bumper guide" attachments to vehicles, especially large vehicles like semi-trucks. Traditionally, a bumper guide is an elongated metal rod extending vertically from a truck bumper and includes a marker light at the tip of the rod. The bumper guide extends vertically, high enough so the driver of a large vehicle can see the upper tip of the guide. The marker on the upper tip indicates the width of the truck to the driver, so the driver can properly maneuver the vehicle without hitting objects to the side. The upper tip might be a light covered by a colored lens, so the width of the truck or other vehicle will be known, even when driving in the dark.

The earliest bumper guide patent was issued to John F. Bores on Jan. 7, 1975 as U.S. Pat. No. 3,858,924. Bores '924 shows a rod-like attachment "adapted to be mounted on the ends of front bumpers of trucks for the purpose of permitting a truck operator to be fully aware of the exact positions of the ends of each bumper." (See Bores '924 Abstract). Bores '924 includes an upstanding "standard" that is offset immediately above the bumper. The upper tip of the device includes a marker light in a lamp socket that indicates to the driver the location of the bumper guide.

The inventor herein has located various embodiments of the Bores bumper guide. The light element on the top of the bumper guide may comprise lenses of many shapes and sizes. Some of the marker lights are tubular in shape and extend several inches above the body of the guide. The inventor has also located bumper guides in the marketplace that include a lens assembly that runs the entire length of the guide rod. These longer marker lights continue to mark only the width of the associated vehicle and provide little or no illumination otherwise.

A related type of bumper marker is shown in U.S. Pat. No. 3,998,285, issued to Stephen Robert Cooper on Dec. 21, 1976. As noted in the abstract of Cooper '285, the invention therein includes a parking guide attached to the back bumper of a vehicle. The parking guide includes a hollow, translucent guide rod, which is movable in response to a motor within a control box. The parking guide moves from a horizontal position of lying on the bumper to a vertically extended position, at the option of the user. A light within a control box illuminates the guide rod when the rod is in the vertical position. The light allows the driver to see the extended guide rods and indicates the locations of the corners of the vehicle. The marker is useful for parking a vehicle at night.

U.S. Pat. No. 4,313,104 issued to Edward Phillips on Jan. 26, 1982, shows a bumper guide similar to Bores '924 with an improved mounting. Phillips '104 includes an elongated tube member with a marker light at the top tip. Phillips, however, connects the guide rod by a breakaway hinge attaching the lower portion of the guide to the bumper. The hinged mounting allows the bumper guide to be adjusted to a number of positions. The hinged mounting also prevents breakage because the hinged mounting allows the bumper guide to move instead of breaking off when the bumper guide scrapes an object next to the vehicle.

U.S. Pat. No. 4,955,577, issued to Ching on Sep. 11, 1990, shows a relatively recent bumper attachment. Ching '577 describes a detachable mounting assembly "adapted for location of fog lights and flag poles having light elements disposed at the top end thereof." (See Abstract). The Ching '577 patent provides a cross bar that is temporarily attached to a vehicle under the front bumper and allows lights, flags, or other attachments to be attached to the crossbar. The crossbar may be removed when not in use.

All of the related lighting assemblies disclosed herein have functional limitations. The inventor discovered that none of the prior lighting apparatuses provide light all the way from one end of a vehicle to another end or beyond. The prior apparatuses fail to present a convenient structure that is permanently attached to the vehicle. The inventor herein discovered a lack of vehicle illumination devices with a remotely controlled light source bright enough to illuminate a large area around and along the side of a vehicle or past the rear of the vehicle. The currently available sources of light around a vehicle are cumbersome to install and even less convenient to operate. The vehicle illumination apparatus described herein discloses a means to address these functional limitations of previous vehicle illumination systems.

SUMMARY OF INVENTION

The invention herein is a vehicle illumination assembly that provides a bumper guide with two sources of illumination. A first light source extends longitudinally down the length of the bumper guide and has sufficient luminescent power to shine all the way down a vehicle. The first light illuminates the region around the side and rear of a vehicle, all the way from one end of the vehicle to the other. A second source of illumination provides a marker light on top of the assembly to alert the driver of the width of the vehicle. The invented vehicle illumination assembly includes a motorized embodiment that is remotely controlled to turn about the longitudinal axis of the guide. The lighting sources of the vehicle illumination assembly are controlled by switches within the interior of the vehicle.

DETAILED DESCRIPTION

The invention herein meets a need in the field of vehicle illumination by providing two sources of light within a vertically extending illumination assembly attached to a bumper on one end of a vehicle. The vehicle illumination assembly disclosed herein provides a light source that traditional bumper guides have yet to include. Bumper guides available on the market today are metal rods extending vertically from the front bumper of a vehicle. Available bumper guides have an illuminated tip that is visible to the vehicle driver and marks the width of the vehicle for maneuvering in the dark between objects on either side. Traditional bumper guides provide little or no light around the vehicle but are only bright enough to show the driver the vehicle width by an illuminated tip of the guide.

The inventor herein provides an improved vehicle illumination assembly for providing light around a vehicle and for visibly marking the width of the vehicle. The vehicle illumination assembly (5) includes an elongated hollow guide member (10) connected to a bumper (20) on one end of a vehicle. The outer surface (12) of the guide member (10) defines a longitudinal opening (13) to the interior of the hollow guide member (10). The assembly (5) includes a first light source (15) within the longitudinal opening (13) of the guide member (10) to provide visible light extending horizontally at least as far as the length of the vehicle. The natural angle of the light beam results in a well lit area to the side and to both ends of the vehicle as well.

Figure 3:
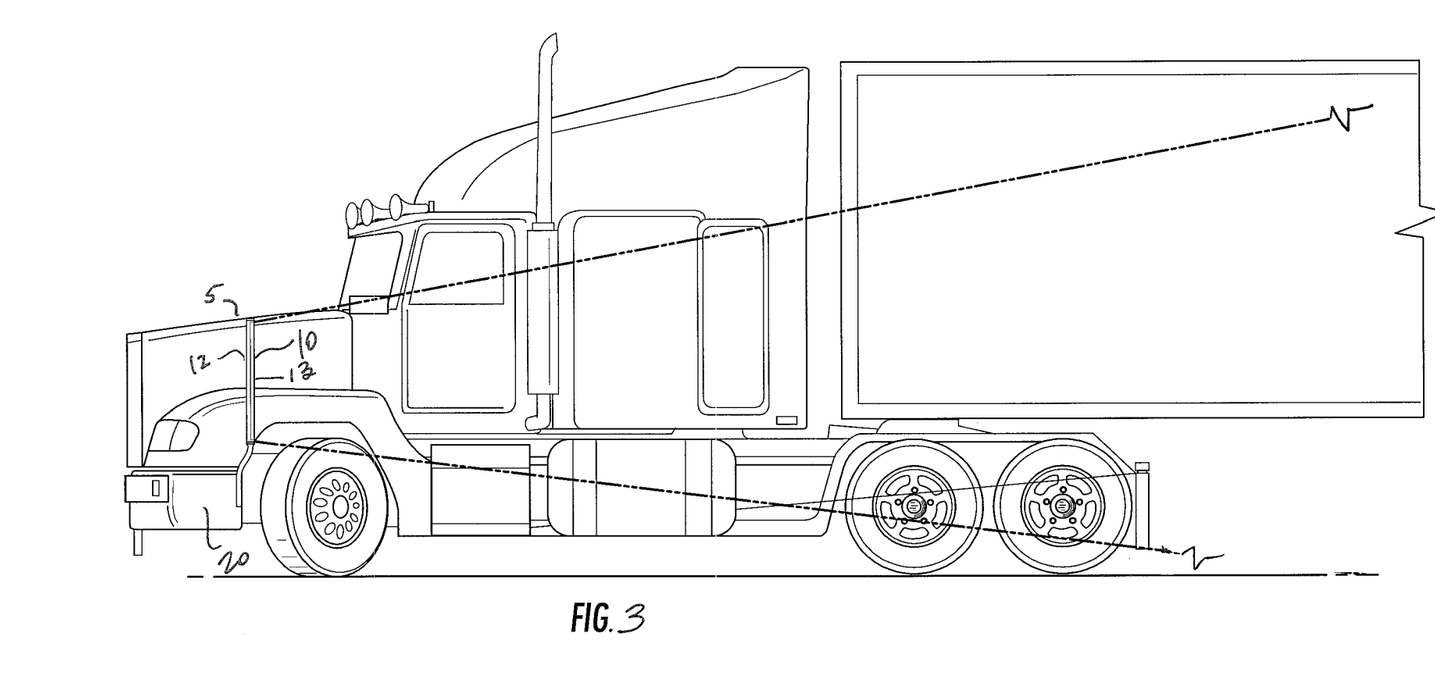
FIG. 3 is a side view of a truck with the invented vehicle illumination assembly shining a beam of light along the side of the truck.

The description of the vehicle illumination assembly (5) herein often refers to the assembly being attached to a truck. This description is for convenience only and is not intended to limit the types of vehicles that will benefit from the invention. The vehicle illumination assembly may be attached to a bumper on either end of any type of vehicle but is especially useful on large trucks, such as semi-trucks, that haul trailers or other attached equipment. Large trucks often require lighting for loading and unloading, backing into dark freight areas, and working on hauled equipment. FIG. 3 illustrates that the vehicle illumination assembly disclosed herein provides enough light to significantly increase visibility around the side of the truck and particularly behind the truck. Of course, the light source (15) within the guide member (10) must be aimed in a direction that is most useful to the user to illuminate preferred areas. As a further enhancement, the vehicle illumination assembly (5) of this invention is fully operable from within the interior of the associated vehicle.

Figure 1:
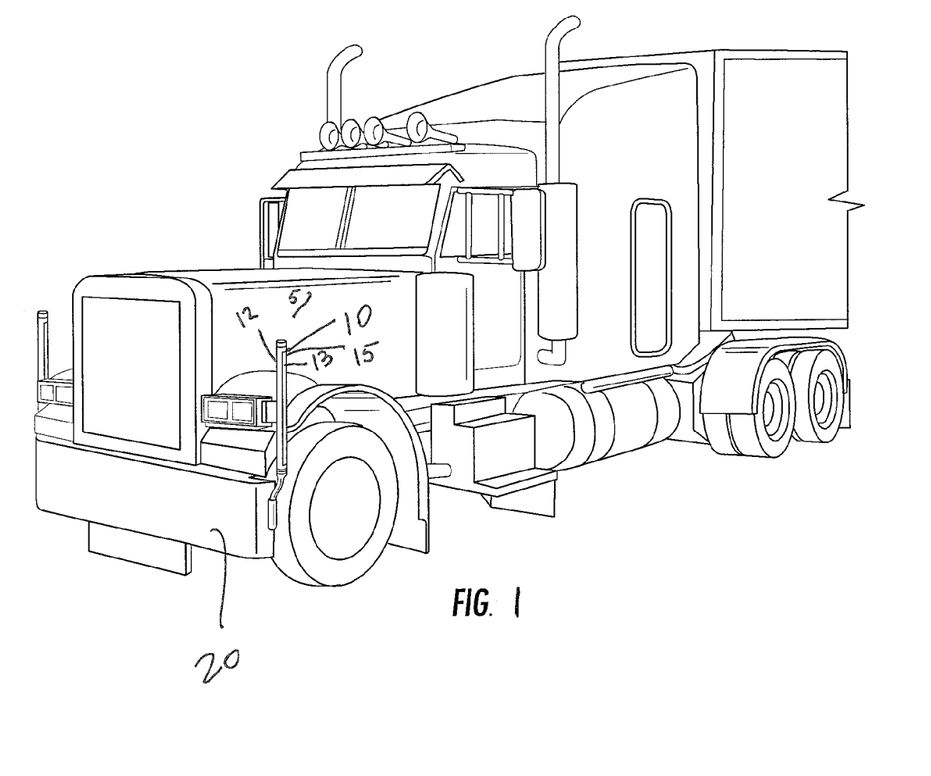
FIG. 1 is a side view of a truck with the invented vehicle illumination assembly installed on the front bumper with the longitudinal light source pointing toward the rear.
Figure 2:
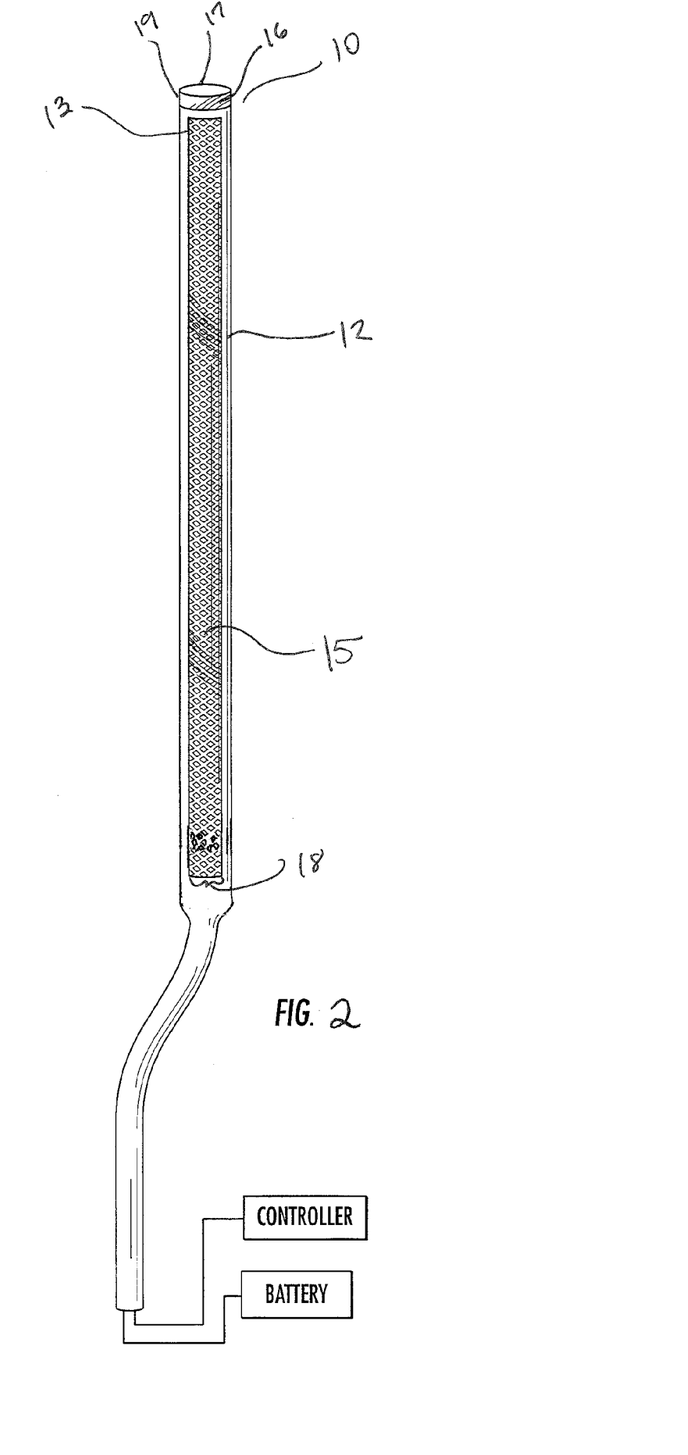
FIG. 2 is a front view of the vehicle illumination assembly with a marker light at the top and a longitudinal light source extending down the front of the assembly.

In one embodiment (shown in FIGS. 1 and 3), the vehicle illumination assembly (5) is attached to a front bumper (20) of a vehicle and directs light toward the rear. The vehicle illumination assembly (5) would also provide light if attached to a rear bumper, but the front bumper location is generally preferred because the driver can see the guide member (10) more easily in the front. A guide member (10) that is visible to the driver may also mark the width of the vehicle in addition to providing bright light around the vehicle.

A number of alternatives are available to attach the disclosed vehicle illumination assembly (5) to a vehicle bumper. One embodiment attaches an elongated guide member (10) of the vehicle illumination assembly (5) perpendicularly to the bumper. In this perpendicular attachment, the guide member (10) of the assembly extends vertically to a sufficient height so that the tip (17) of the guide member (10) is visible to the driver. For embodiments in which the illumination assembly is attached to a car, the guide member (10) may extend approximately two feet above the bumper. For embodiments in which the illumination assembly (5) is attached to a large truck, the guide member (10) may extend approximately three feet above the bumper. The height to which the guide member (10) extends is an optional dimension, depending upon the preferences of the driver and the dimensions of the vehicle upon which the guide member (10) will be mounted. Generally, the vehicle illumination assembly (5) must extend vertically from the bumper to a height so that the top tip (17) of the assembly is visible through the windshield from the driver's seat of the vehicle. The invention herein encompasses designs by which the guide member (10) may be lengthened or shortened by the use of telescoping segments allowing for adjustments to the overall length.

The disclosed vehicle illumination assembly (5) may be more contoured than a simple vertical rod. One goal of the vehicle illumination assembly (5) is to provide a source of light around the sides and ends of a vehicle. Adding curvature to the guide member (10) of the vehicle illumination assembly (5) is one means of projecting light away from the body of the vehicle and into the surrounding areas. One embodiment of the vehicle illumination apparatus (5), therefore, includes a guide member (10) that attaches to the vehicle bumper and curves outwardly, away from the body of the vehicle, before extending vertically. The curvature provides a light source (15) within the guide member (10) that is horizontally displaced from the bumper in order to illuminate a larger area.

Figure 4:
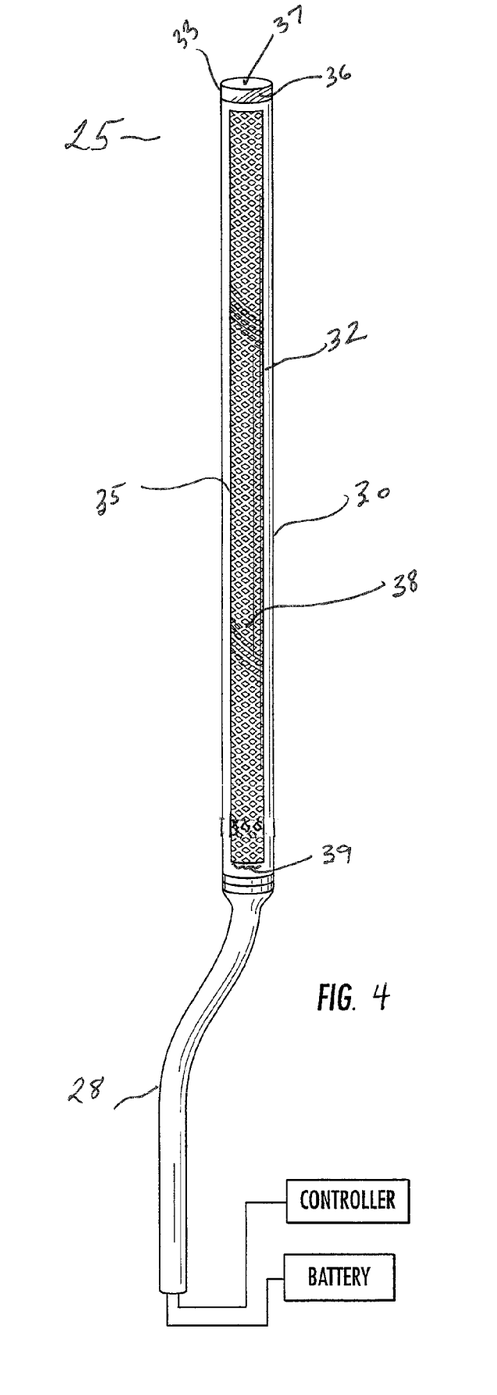
FIG. 4 is a front view of a multi-part vehicle illumination assembly with a guide member attached to a supporting base member.

The vehicle illumination assembly (25) provided herein may be comprised of more than one component part, as shown in FIG. 4. The vehicle illumination assembly (25) may include a hollow base member (28) attached directly to the bumper. The hollow guide member (30) attaches to the base member (28) or may be inserted into the base member (28). This embodiment provides a vehicle illumination assembly (25) for shining light around a vehicle and for visibly marking the width of the vehicle. The embodiment includes a hollow base member (28) connected to the bumper of a vehicle and an elongated hollow guide member (30) connected to the base member (28). The outer surface (32) of the guide member (30) defines a longitudinal opening (35) to the interior of the hollow guide member (30). A first light source (38) fits within the longitudinal opening (35) of the guide member (30) to provide visible light extending at least as far as the length of the vehicle.

The multi-part assembly (25) may advantageously include a curvature in the body design to extend the light beam emanating from the guide member (30) outwardly, away from the side of the vehicle. In this embodiment, the base member (28) curves outwardly from the bumper, and the guide member (30) extends vertically from the base member (28). The guide member (30) is then horizontally displaced away from the bumper. The light (38) within the guide member (30) will then illuminate areas farther out from the body of the car than would a straight illumination assembly.

Figure 5:
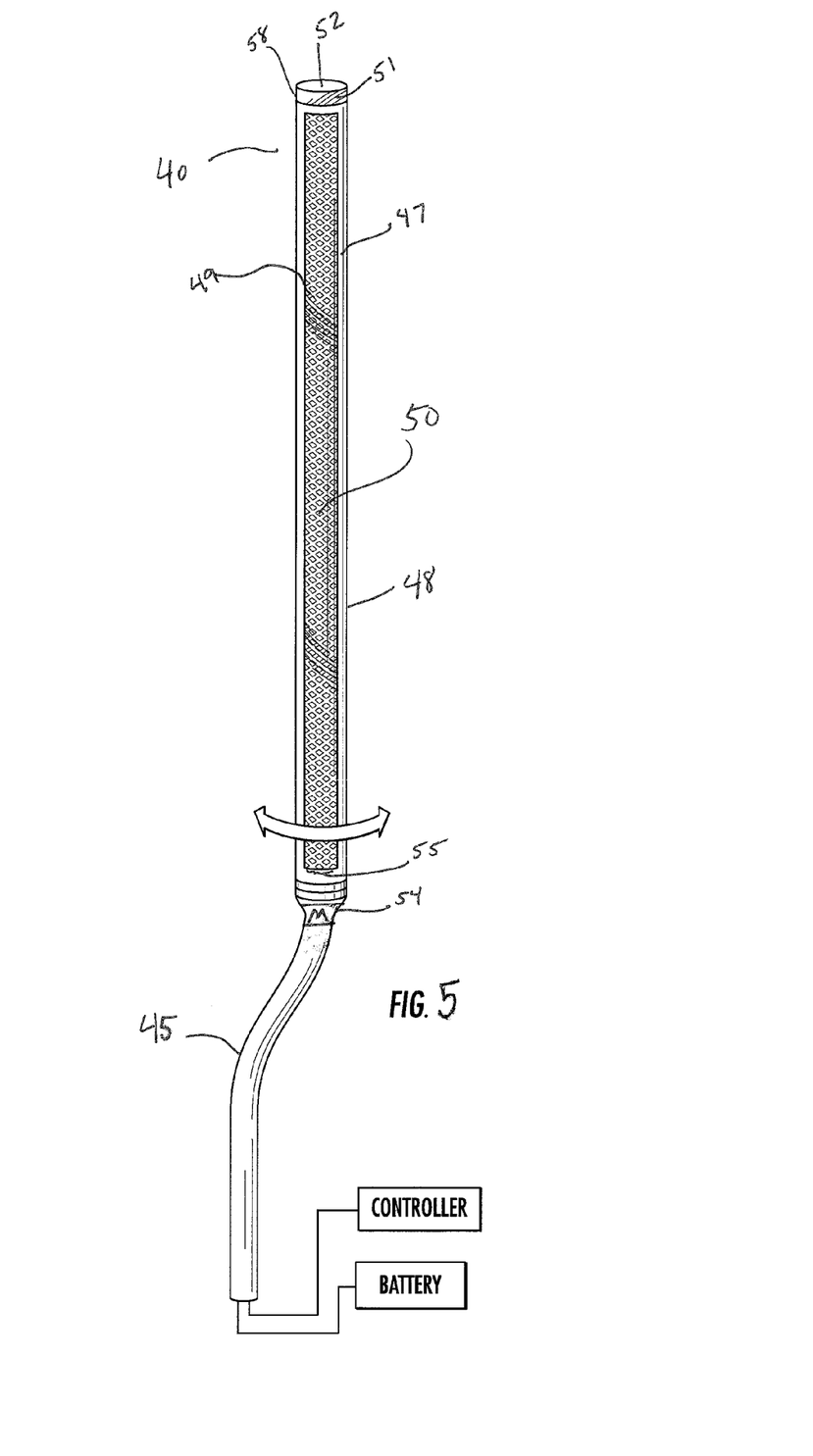
FIG. 5 is a front view of a multi-part vehicle illumination assembly with a rotating guide member attached to a supporting stationary base member.

A multi-part assembly (40) of the claimed vehicle illumination system allows for yet another enhancement a rotating guide member (48), as shown in FIG. 5. The multi-part assembly (40) allows for a stationary base (45) to be attached directly to the bumper. The separate guide member (48) extends vertically from the base (45) and may be moved in different directions to aim the first light source (50) at different positions. In this embodiment, the guide member (48) rotates about its longitudinal axis either continuously or in steps. The position of the guide member (48) determines the direction of light from the first light source (50). The position may be changed by manually turning the guide member (48) in the desired direction or by activating a motor (54) to turn the guide member (48).

The motorized version of the vehicle illumination assembly (40) is particularly useful for remotely controlling the position of the guide member (48) from within the vehicle. The motorized embodiment includes a hollow base member (45) connected to the bumper of a vehicle. An elongated hollow guide member (48) rotatably connects to the base member (45) such that the guide member (48) rotates around its longitudinal axis while the base member remains stationary. The guide member (48) is therefore pivotally connected to the base member (45). A motor (54) is connected to the guide member (48) for turning the guide member. As in prior embodiments, the outer surface (47) of the guide member (48) defines a longitudinal opening (49) to the interior of the hollow guide member (48). A first light source (50) within the longitudinal opening of the guide member provides visible light extending at least as far as the length of the vehicle.

The means by which the guide member rotates about its longitudinal axis encompasses standard motors and gearing that are commonly available today. A servomotor, for example, is an electromechanical device in which an electrical input determines the position of the armature of a motor. The motor (54) can be controlled by switches within the interior of the vehicle. The armature of the motor (54), connected to corresponding gears, will dictate the position of the guide member at the option of the user.

Alternatively, the rotating guide member may include longitudinal support rods configured to support gearing mechanisms that turn in accordance with an electrical signal applied to a connected motor (54). The motor (54) includes a drive unit with a drive gear supported on one of the longitudinal rods. Although a single direction motor would work, a dual direction motor provides more options for the user to efficiently position the guide member.

Other mechanical means for controllably turning the guide member from within the vehicle include actuator assemblies that are pivotally engaged with the elongated guide member. The actuators are driven by a dual direction motor that is controlled by a switch inside the vehicle.

The motorized version of the disclosed vehicle illumination assembly (40) provides a guide member (48) that the driver may rotate to point the enclosed light source (50) in a preferred direction. The driver controls the motor from the driver's seat for convenient use. Of course, the motor (54) that turns the guide member (48) must be mounted in close proximity of the guide member, either within the guide member itself or within the base member and connect by gearing.

Both the single member and multi-part vehicle illumination assemblies described above may include first and second light sources therein. The first light source (15, 38, or 50) is located within the longitudinal opening (13, 35, or 49) of the guide member and provides light of sufficient luminescent power to illuminate a vehicle from one end to the other. The first light source (15, 38, or 50) is optimally bright enough to provide light from the front bumper past the rear bumper to the area behind the vehicle. The second light source (16, 36, or 51) is located at the top tip of the guide member and is used to mark the location of the guide member for the driver. The second light source (16, 36, or 51), therefore, is useful to show a driver the width of the vehicle when driving in the dark and maneuvering the vehicle between objects on either side.

The broad range of vehicles on which the invented illumination assembly may be attached results in an equally broad range of light sources that may be included within the longitudinal opening of the guide member. The light source within the longitudinal opening of the guide member is referred to herein as the first light source(15, 38, or 50). The first light source (15, 38, or 50) may be any light source that has sufficient luminescent power to provide a visible beam of light directed near the side of the vehicle and extending at least from one end of the vehicle to the other. Traditional light bulbs, halogen lights, or any other electrical, or even chemical, light source is appropriate for inclusion in the illumination assembly.

A preferred embodiment of the invention includes a halogen light located within a vehicle illumination assembly connected to the front of a vehicle. The halogen light should be selected for its capability of illuminating a broad region to the side of the associated vehicle and shine all the way past the rear of the vehicle. By using a halogen light as the first light source (15, 38, or 50), the inventors herein are able to illuminate a wide region to the side of the vehicle and provide extended light beams past the rear of the vehicle. The well lit areas around the vehicle are optimized for working safely and efficiently therein.

One important aspect of the invention herein is that the vertically extending guide member (10, 30, or 48) has an outer surface that defines a longitudinal opening (13, 35, or 39) to the hollow interior of the guide member. This longitudinal opening ultimately houses the first light source (15, 38, or 50). Previous bumper guides provide no means to house a light source that is sufficiently bright or properly positioned to provide light from one end of a vehicle to areas around the other end of the vehicle. The longitudinal opening (13, 35, or 39) within the claimed guide member is of sufficient size to house such a desirable light source with more luminescent power than previously disclosed in traditional bumper guides.

The dimensions of the guide member and the first or second light sources therein are adjustable, depending on the size of the illumination assembly and the type of vehicle on which the illumination assembly will be installed. In one preferred embodiment, the vehicle illumination assembly has a surface that defines an opening that extends from about one-half to about three-fourths of the length of the guide member. The first light source (15, 38, or 50) fits within the opening and may extend the entire length of the opening or some portion thereof, depending on the type of light source.

A typical embodiment includes a guide member with a cross section that is about two to three inches at its widest point. The invention may be practiced with light sources that fit within guide members (10, 30, or 48) that are up to 6 inches wide, or even wider if the particular use requires such. The first light source (15, 38, or 50) to be included therein fits within the width of the guide member accordingly. The vehicle illumination assembly of this invention may be of any width desired so long as the overall width of the truck, including attached illumination assemblies, mirrors, etc., do not exceed proper width dimensions allowed by law for traveling on public highways. Wider guide members could house correspondingly wider light sources with greater power.

One preferred embodiment of the vehicle illumination assembly attaches to the front bumper of a semi truck. The first light source (15, 38, or 50) of this embodiment has sufficient luminescent power to provide a visible beam of light from the front bumper, down the side of the truck, to areas past the rear of the truck. This embodiment requires a first light source that provides a visible beam of light extending horizontally at least 75 feet from the first light source.

One important specification in selecting a first light source (15, 38, or 50) for incorporation into the guide member (10, 30, or 48) is the distance to which the light source will emit a beam of visible light. For purposes of this disclosure, the inventor measures the distance of the beam of light horizontally from the light source to the farthest point at which the beam illuminates and is visible. One purpose of the invention herein is to illuminate areas to the side and rear of a vehicle on which the new illumination assembly is mounted. The selected first light source (15, 38, or 50), inserted into a longitudinal opening (13, 35, or 39) in the guide member, must emit a beam of light capable of illuminating a region extending from one end of a vehicle past the other end. A light source that emits beams extending 75 feet or greater would sufficiently illuminate a large majority of vehicles available today, even semi-trucks with trailer extensions. Other embodiments on different types of vehicles would require less powerful first light sources to be useful. For instance, a vehicle illumination assembly attached to a sports utility vehicle would only require a light source that emits light out to about 25 feet. Available lights, particularly halogen lights, easily provide enough luminescent power to enlighten regions behind a truck at a distance of at least 75 feet from the light source.

The first light source of the guide member described herein may be at least one light bulb electrically connected to a power source and controlled by a switch. The first light source will be connected to the power source available within a vehicle's electrical system. The required wiring runs from the vehicle electrical power source, up the hollow guide member, and connects to the first light source. The controlling switch may be located within the interior of the vehicle for use by the driver turning the light on and off.

The embodiments of the vehicle illumination assembly provided herein also include an outer surface that defines a second opening at the top of the guide member leading into the hollow interior of the guide member. A second light source (16, 37, 52) is connected to the second opening at the top of the guide member to visibly mark the location of the guide member and the width of the vehicle. The second light source (16, 37, 52) includes a light bulb that is electrically connected to a power source and controlled by a switch.

Both the first and second light sources are electrically connected to the vehicle's electrical system by wiring that runs up the hollow base and/or guide member. The first and second light sources should be remotely controlled by switches located in a convenient position for use by the driver without leaving the driver's seat.

The light sources on the guide member include standard lenses that cover the light sources to provide brighter color or a controlled light path from the source. The first and second light sources are covered by respective first (18, 39, 55) and second (19, 33, 58) lenses secured to the surface of the guide member to enclose the respective first and second openings in the guide member. The invention encompasses a vehicle illumination assembly wherein first and second lenses are each selected from the group consisting of colored lenses, translucent lenses, and transparent lenses.

Throughout this disclosure, the vehicle illumination assembly is described herein as being connected or attached to a bumper on a vehicle. Many means are available to attach the vehicle illumination assembly to the bumper. The inventors do not wish to limit the invention by describing the attachment means in great detail, but provide illustrative examples instead. The vehicle illumination assembly, for example, may be bolted to the side of a bumper with a commonly available mounting bracket. Other means for mounting the illumination assembly include a sleeve that is mounted directly to the bumper by bolts and flanges. The guide member or the base member could then slide directly into the sleeve for a secure attachment. Other embodiments provide clamps around components of the vehicle illumination assembly, and such clamps are tightened into a bumper by bolts and screws.

The invention herein provides an extended light source that illuminates regions around a vehicle and is particularly adaptable to large trucks. The added lighting assists the driver of the vehicle in backing into dark areas and provides a safer work area around the vehicle. In terms of safety, the vehicle illumination assembly may include motion detectors that switch the light source into the on state when movement occurs within the range of a sensor. Motion detector lights are commonly available in the market place and easily adapted for installation into the vehicle illumination assembly of the claimed invention. A motion detector switching on a strongly luminescent light source serves as an excellent security device to avoid theft, property damage, or even terrorist activities.

In the drawings and specification, there have been disclosed typical embodiments on the invention and, although specific terms have been employed, they have been used in a generic and descriptive sense only and not for purposes of limitation, the scope of the invention being set forth in the following claims.

That which is claimed is:

1. A vehicle illumination assembly for providing light around a vehicle and for visibly marking the width of the vehicle, comprising:
    an elongated hollow guide member connected to a bumper on one end of a vehicle, wherein the outer surface of said guide member defines a longitudinal opening to the interior of said hollow guide member; and
    a first light source within the longitudinal opening of said guide member to illuminate areas around the side and ends of the vehicle.

2. A vehicle illumination assembly according to claim 1, wherein said guide member is perpendicularly connected to a bumper on the vehicle.

3. A vehicle illumination assembly according to claim 1, wherein said guide member comprises a curved section and a straight section, with said curved section turning outwardly from the bumper and said straight section extending vertically from said curved section so that the straight section is horizontally displaced away from the bumper.

4. A vehicle illumination assembly according to claim 1, wherein said surface defines an opening that extends from about one-half to about three-fourths of the length of said guide member.

5. A vehicle illumination assembly according to claim 1, wherein the first light source extends within the entire length of the opening.

6. A vehicle illumination assembly according to claim 1, wherein said guide member is so dimensioned as to house a first light source that provides visible beams of light extending horizontally at least 75 feet from said light source.

7. A vehicle illumination assembly according to claim 1, wherein said first light source comprises at least one light bulb electrically connected to a power source and controlled by a switch.

8. A vehicle illumination assembly according to claim 1, wherein said surface defines a second opening at the top of said guide member leading into the hollow interior of said guide member.

9. A vehicle illumination assembly according to claim 8, further comprising a second light source within the second opening at the top of the guide member, said second light source serving to visibly mark the location of the guide member and the width of the vehicle.

10. A vehicle illumination assembly according to claim 9, wherein said second light source comprises a light bulb that is electrically connected to a power source and controlled by a switch.

11. A vehicle illumination assembly according to claim 9, wherein said first and second light sources are separately controlled by switches that are selectively operable from within the interior of the vehicle.

12. A vehicle illumination assembly according to claim 9, wherein said first and second light sources are covered by respective first and second lenses secured to the surface of said guide member to enclose the respective first and second openings in said guide member.

13. A vehicle illumination assembly according to claim 12, wherein said first and second lenses are each selected from the group consisting of colored lenses, translucent lenses, and transparent lenses.

14. A vehicle illumination assembly for providing light around a vehicle and for visibly marking the width of the vehicle, comprising:
- a hollow base member connected to a bumper on one end of a vehicle;
- an elongated hollow guide member connected to said base member, wherein the outer surface of said guide member defines a longitudinal opening to the interior of said hollow guide member; and
- a first light source within the longitudinal opening of said guide member to illuminate areas around the side and ends of the vehicle.

15. A vehicle illumination assembly according to claim 14, wherein said base member curves outwardly from the bumper, and said guide member extends vertically from said base member so that said guide member is horizontally displaced away from the bumper.

16. A vehicle illumination assembly according to claim 14, wherein said surface defines an opening that extends from about one-half to about three-fourths of the length of the guide member.

17. A vehicle illumination assembly according to claim 14, wherein the first light source extends within the entire length of the opening.

18. A vehicle illumination assembly according to claim 14, wherein said guide member is so dimensioned as to house a first light source capable of emitting visible beams of light extending horizontally at least 75 feet from said light source.

19. A vehicle illumination assembly according to claim 14, wherein said first light source comprises at least one light bulb electrically connected to a power source and controlled by a switch.

20. A vehicle illumination assembly according to claim 14, wherein said surface defines a second opening at the top of said guide member leading into the hollow interior of said guide member.

21. A vehicle illumination assembly according to claim 20, further comprising a second light source within the second opening at the top of the guide member, said second light serving to visibly mark the location of the guide member and the width of the vehicle, wherein said second light is electrically connected to a power supply and controlled by a switch.

22. A vehicle illumination assembly according to claim 21, wherein said first and second light sources are separately controlled by switches within the interior of the vehicle.

23. A vehicle illumination assembly according to claim 21, wherein said first and second lights are covered by respective first and second lenses secured to the surface of said guide member to enclose the first and second openings in said guide member.

24. A vehicle illumination assembly according to claim 23, wherein said first and second lenses are each selected from the group consisting of colored lenses, translucent lenses, and transparent lenses.

25. A vehicle illumination assembly for providing light down the side of a vehicle and for visibly marking the width of the vehicle, comprising:
- a hollow base member connected to the bumper of a vehicle;
- an elongated hollow guide member rotatably connected to said base member such that said guide member rotates around its longitudinal axis and said base member remains stationary, wherein the outer surface of said guide member defines a longitudinal opening to the interior of said hollow guide member;
- a motor connected to said guide member for turning said guide member; and
- a first light source within the longitudinal opening of said guide member to illuminate areas around the side and ends of the vehicle.

26. A vehicle illumination assembly according to claim 25, wherein said base member curves outwardly from the bumper and said guide member extends vertically from said base member so that said guide member is horizontally displaced away from the bumper.

27. A vehicle illumination assembly according to claim 25, wherein said surface defines an opening that extends from about one-half to about three-fourths of the length of the guide member.

28. A vehicle illumination assembly according to claim 25, wherein the first light source extends the entire length of the opening.

29. A vehicle illumination assembly according to claim 25, wherein said guide member is so dimensioned as to house a first light source with enough luminescent power to illuminate the length of the vehicle.

30. A vehicle illumination assembly according to claim 25, wherein said first light source comprises at least one light bulb electrically connected to a power source and controlled by a switch.

31. A vehicle illumination assembly according to claim 25, wherein said surface defines a second opening at the top of said guide member leading into the hollow interior of said guide member.

32. A vehicle illumination assembly according to claim 31, further comprising a second light source within the second opening at the top of said guide member, said second light serving to visibly mark the location of the guide member and the width of the vehicle, wherein said second light is electrically connected to a power supply and controlled by a switch.

33. A vehicle illumination assembly according to claim 32, wherein said first and second light sources are separately controlled by switches within the interior of the vehicle.

34. A vehicle illumination assembly according to claim 32, wherein said first and second lights are covered by respective first and second lenses secured to the surface of said guide member to enclose the first and second openings in said guide member.

35. A vehicle illumination assembly according to claim 32 wherein said first and second lenses are each selected from the group consisting of colored lenses, translucent lenses, and transparent lenses.

36. A vehicle illumination assembly according to any one of claims 1, 14, or 25 wherein the first light source is controlled by a motion detector that switches the first light source to the on state upon detecting motion around the vehicle.

37. A vehicle illumination assembly and vehicle bumper combination, comprising a first elongated hollow guide member connected to a first end of a bumper on a vehicle, wherein the outer surface of said first guide member defines a longitudinal opening to the interior of said first hollow guide member;
- a second elongated hollow guide member connected to an opposite end of said bumper, wherein the outer surface of said second guide member defines a longitudinal opening to the interior of said second hollow guide member; and
- first and second light sources within each respective longitudinal opening of each respective guide member, providing visible light extending at least as far as the length of the vehicle.

* * * * *